US009272651B1

(12) United States Patent
Maya et al.

(10) Patent No.: US 9,272,651 B1
(45) Date of Patent: Mar. 1, 2016

(54) STORAGE ASSEMBLY WITH CUP HOLDER AND VEHICLE INCLUDING THE SAME

(71) Applicant: FORD GLOBAL TECHNOLOGIES, LLC, Dearborn, MI (US)

(72) Inventors: Alberto Maya, Estado De Mexico (MX); Miguel Angel Mora Rojas, Puebla (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/538,915

(22) Filed: Nov. 12, 2014

(51) Int. Cl.
*B60N 3/10* (2006.01)

(52) U.S. Cl.
CPC ....................... *B60N 3/102* (2013.01)

(58) Field of Classification Search
CPC ................... B60N 3/102; B60N 3/10
USPC ............ 296/37.13, 37.14, 37.15, 37.16, 37.8, 296/24.46
See application file for complete search history.

(56) References Cited

U.S. PATENT DOCUMENTS

| 5,520,313 | A | * | 5/1996 | Toshihide | ............ | B60N 2/4686 220/815 |
| 5,620,122 | A | * | 4/1997 | Tanaka | ............ | B60N 3/102 220/264 |
| 5,718,405 | A | * | 2/1998 | Adachi | ............ | B60N 3/108 224/926 |
| 6,470,627 | B2 | * | 10/2002 | Fukuo | ............ | E05F 1/1215 224/275 |
| 6,547,326 | B1 | | 4/2003 | Walkinshaw et al. | | |
| 6,705,580 | B1 | | 3/2004 | Bain | | |
| 7,481,343 | B2 | * | 1/2009 | Misumi | ............ | B60N 3/106 224/282 |
| 7,487,945 | B2 | | 2/2009 | Liu et al. | | |
| 7,789,265 | B2 | | 9/2010 | Kearney et al. | | |
| 7,866,620 | B2 | | 1/2011 | Kaemmer | | |
| 8,360,380 | B2 | | 1/2013 | Soma et al. | | |
| 8,534,862 | B2 | | 9/2013 | Simon et al. | | |
| 8,573,552 | B2 | | 11/2013 | Andersson et al. | | |
| 8,757,571 | B2 | * | 6/2014 | Shimajiri | ............ | B60N 3/102 224/282 |
| 2001/0052524 | A1 | * | 12/2001 | Ichimaru | ............ | B60N 2/4686 220/815 |
| 2011/0297717 | A1 | | 12/2011 | Kaemmer | | |

* cited by examiner

*Primary Examiner* — Jason S Morrow
*Assistant Examiner* — E Turner Hicks
(74) *Attorney, Agent, or Firm* — Vichit Chea; Law Firm of Dr. Junqi Hang PLC

(57) ABSTRACT

In one or more embodiments, a storage assembly with a cup holder includes a housing including a track extending in a longitudinal direction and a first cavity partially defining the cup holder, a cover including a foot portion and movable along the longitudinal direction between first and second open positions via engagement of the foot portion and the track, and one or more retractable protrusions supported on the cover and providing access for facilitating movement of the cover relative to the track.

17 Claims, 4 Drawing Sheets

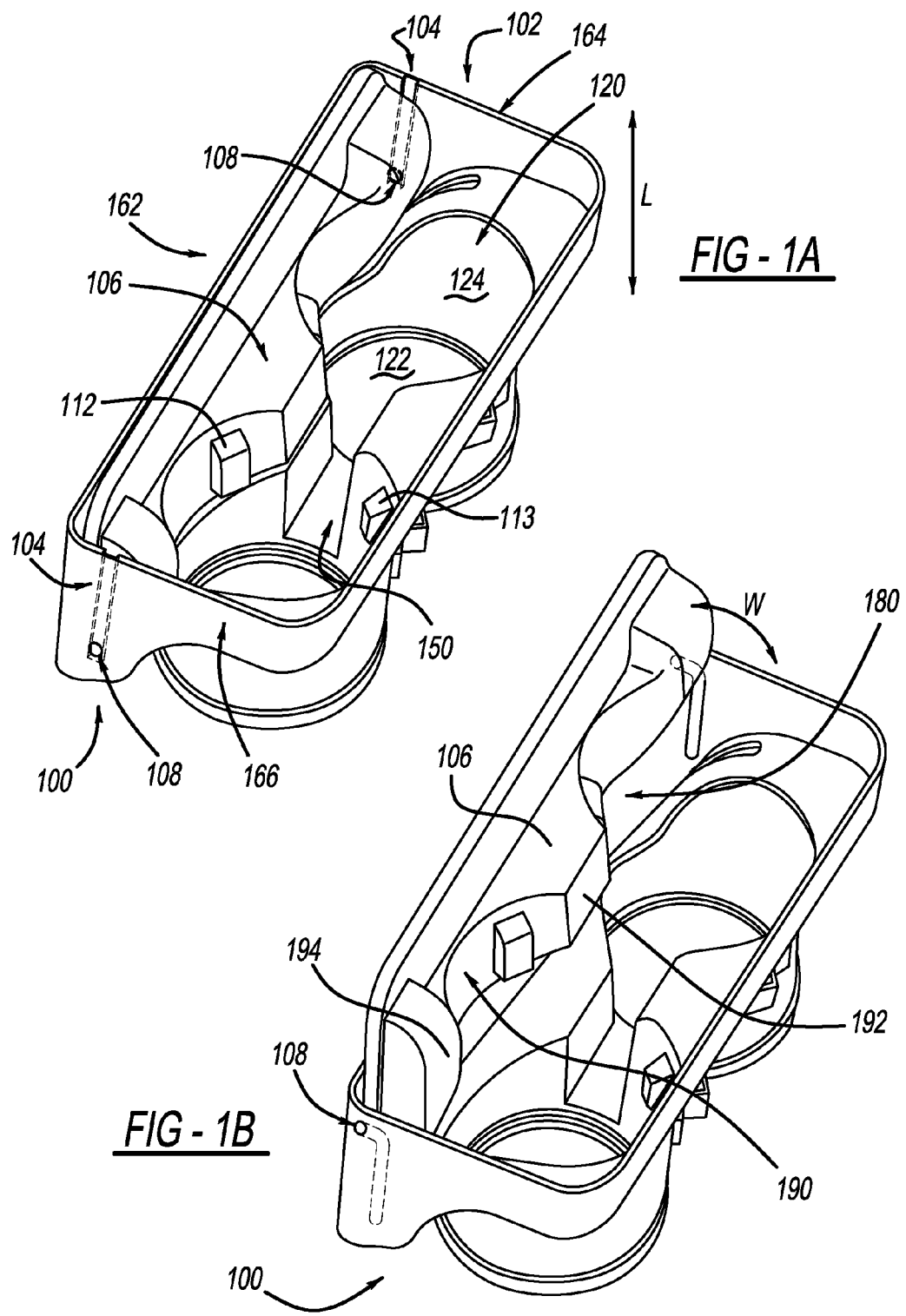

STORAGE ASSEMBLY WITH CUP HOLDER AND VEHICLE INCLUDING THE SAME

TECHNICAL FIELD

The present invention in one or more embodiments generally relates to a storage assembly with a cup holder and a vehicle including the same.

BACKGROUND

Automotive interiors often feature a number of storage compartments, such as a cup holder positioned in rear seat armrest or the console. Due to package requirement in certain vehicle designs, it is often desirable to provide a compact storage assembly that utilizes the interior space efficiently and provides covering to its associated cup holder. U.S. Pat. No. 7,487,343 discloses a kind of vehicle cup holding structure including a closable.

SUMMARY

According to one or more embodiments, a storage assembly with a cup holder includes a housing including a track extending in a longitudinal direction and a first cavity partially defining the cup holder, a cover including a foot portion and movable along the longitudinal direction between first and second open positions via engagement of the foot portion and the track, and one or more retractable protrusions supported on the cover and providing access for facilitating movement of the cover relative to the track.

The track may further include an end portion about which the cover pivots from the second open position to a closed position.

The one or more retractable protrusion may include a tongue portion extending toward a floor of the housing, and/or a recess extending toward a floor of the housing, and/or a recess extending toward a side wall of the housing.

The housing may further define a second cavity to partially receive the cover at the first open position.

The track may be at least partially defined as a longitudinal recess on a side wall of the housing. The longitudinal recess may be at least partially a through hole across a width of the side wall. The track may be at least partially positioned on a side wall of the housing, the cover being positioned between the side wall and the first cavity when the cover is at the first open position. The track may include first and second track members at least partially positioned onto first and second opposing side walls of the housing, respectively.

The cover may include a recessed portion together with the first cavity to form the cup holder at the first open position. The cover may further include a support at least partially positioned in the recessed portion for supporting the one or more retractable protrusions.

One or more advantageous features as described herein will be readily apparent from the following detailed description of one or more embodiments when taken in connection with the accompanying drawings.

BRIEF DESCRIPTION OF THE DRAWINGS

For a more complete understanding of one or more embodiments of the present invention, reference is now made to the one or more embodiments illustrated in greater detail in the accompanying drawings and described below wherein:

FIG. 1A illustratively depicts a storage assembly according to one or more embodiments, wherein a cover of the storage assembly is at a first open position;

FIG. 1B illustratively depicts an alternative view of the storage assembly referenced in FIG. 1A, wherein the cover is at a second open position;

DETAILED DESCRIPTION OF ONE OR MORE EMBODIMENTS

Figure 1C:
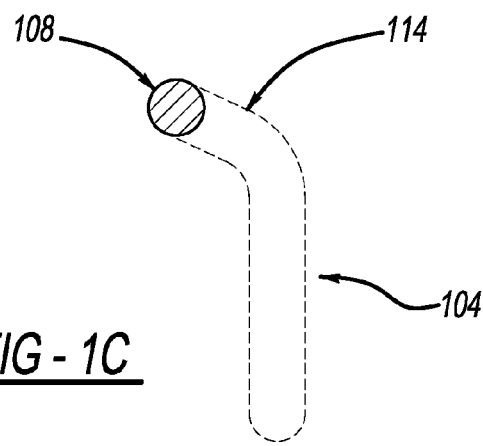
FIG. 1C illustratively depicts an enlarged view of a track of the storage assembly referenced in FIG. 1A or FIG. 1B.

As referenced in the FIG.s, the same reference numerals are used to refer to the same components. In the following description, various operating parameters and components are described for different constructed embodiments. These specific parameters and components are included as examples and are not meant to be limiting.

As will be detailed herein elsewhere, the present invention in one or more embodiments is advantageous at least by providing a storage assembly with a cup holder, wherein the vehicle interior space may be utilized relatively more efficiently, and wherein the storage assembly may be covered when the cup holder is not in use and accordingly, the cover may be readily switched between an open position and a closed position with relatively enhanced ease.

Figure 2:
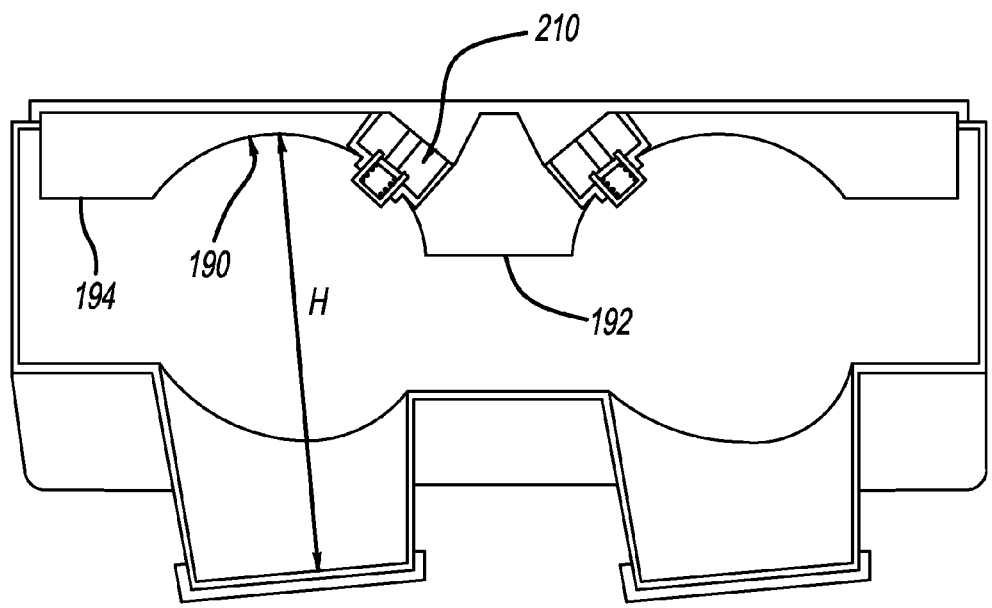
FIG. 2 illustratively depicts a cross-sectional view of the storage assembly referenced in FIG. 1A or FIG. 1B, wherein the cover is at a closed position.

FIG. 1A, FIG. 1B, and FIG. 2 illustratively depict a storage assembly 100 according to one or more embodiments. For purpose of illustration, the storage assembly 100 is shown as including two cup holders. In another one or more embodiments, the storage assembly 100 may include more or fewer cup holders as may be desirable.

The storage assembly 100 includes a housing 102, a cover 106, and one or more retractable protrusions 112. As is further detailed herein elsewhere, the housing 102 includes a track 104 extending in a longitudinal direction "L" and a first cavity 120 partially defining the cup holder. The cover 106 includes a foot portion 108 and is movable along the longitudinal direction "L" between a first open position as illustratively depicted in FIG. 1A and a second open positions as illustratively depicted in FIG. 1B via engagement of the foot portion 108 and the track 104. The retractable protrusion 112 is supported on the cover 106 and provides access for facilitating movement of the cover 106 relative to the track 104.

The retractable protrusion 112 is advantageously provided and positioned so as to function as a holding device to support and stabilize the positioning of a cup as housed inside of the first cavity 120. In addition, and as is described herein elsewhere in relation to FIG. 1A in view of FIG. 3A and FIG. 3B, the retractable protrusion 112 may extend from a recessed portion 190 while the cup holder is not in use, for instance, no cup is present in the cup holder. Such structure may be particularly useful when one desires to have the storage assembly 100 be in a closed position, wherein the user may lift up the cover 106 via access through the retractable protrusion 112 such that the cover 106 is moved relative to the housing 102 along the longitudinal direction "L" from the first open position to the second open position, and thereafter the cover 106 pivots to the closed position along a direction "W" as illustratively depicted in FIG. 2.

Accordingly, the retractable protrusion 112 protrudes or retracts along a transverse direction "T" in performing its function of positioning an incoming cup and providing holding support thereto. Because the retractable protrusion 112 may be fully received within the recessed portion 190 of the cover 106, there is no additional and unnecessary space requirement for accommodating the retractable protrusion 112. Synergistically and as mentioned herein elsewhere, the retractable protrusion 112 may be configured, for instance with one or more recesses illustratively depicted in FIG. 3A, FIG. 3B and FIG. 3C, such that the user may easily reach to the retractable protrusion 112 and use it as a gripping point for lifting up the cover 106.

Referring back to FIG. 3A in view of FIG. 1A, the retractable protrusion 112 may include a tongue portion 322 extending toward a floor 150 of the housing 102 to facilitate the user's access to the retractable protrusion 112 so as to perform an up-lift of the cover 106 with enhanced ease. The retractable protrusion 112 may be designed such that space consumption may be kept at a reasonable minimum. For instance, and as illustratively depicted in FIG. 3A, a lower wall surface 354 of the cover 106 may be positioned further away from an outer surface 340 of the retractable protrusion 112, in direct comparison to an upper wall surface 352 of the cover 106. One non-limiting benefit of such a design is that the tongue 322 is provided with a clearance "D" away from the lower wall surface 354; and accordingly the retractable protrusion 112 may retract along the direction "T" by reducing the clearance "D" to accommodate an incoming cup. On the other hand, both the tongue 322 and a recess 356 defined via the clearance "D" may each be independently used to lift up the cover 106 along the direction "L." The tongue 322 may take any suitable shape and/or size dimension so long as an up-lift of the cover 106 may be effectively assisted accordingly.

Figure 3A:
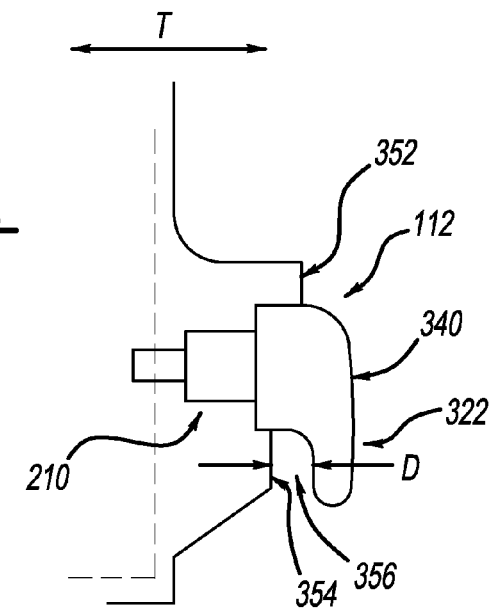
FIG. 3A illustratively depicts an enlarged cross-sectional view of a retractable protrusion of the storage assembly referenced in FIG. 1A or FIG. 1B.
Figure 3B:
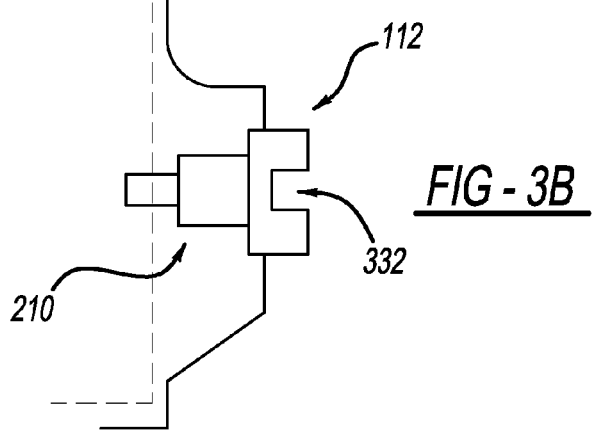
FIG. 3B illustratively depicts another enlarged cross-sectional view of a retractable protrusion of the storage assembly referenced in FIG. 1A or FIG. 1B.

Alternatively, and as illustratively depicted in FIG. 3B in view of FIG. 1A, the retractable protrusion 112 may include a recess 332 extending toward a side wall 162 of the housing 102. The recess 332 may take any suitable shape and/or size dimension so long as an up-lift of the cover 106 may be effectively assisted accordingly.

Figure 3C:
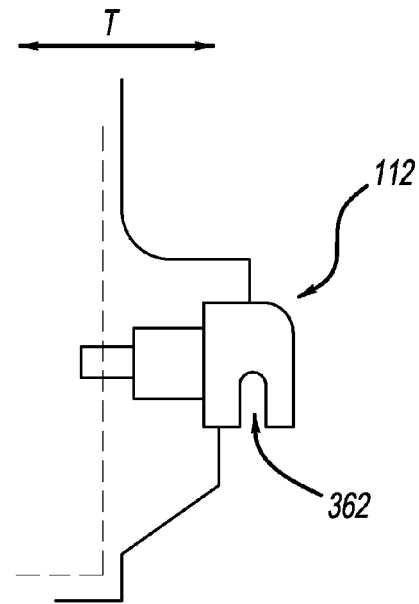
FIG. 3C illustratively depicts yet another enlarged cross-sectional view of a retractable protrusion of the storage assembly referenced in FIG. 1A or FIG. 1B.

Alternatively also, and as illustratively depicted in FIG. 3C, a recess 362 may be positioned at a bottom orientation similar to what is depicted in FIG. 3A. The retractable protrusion 112 along with the recess 362 may retract and extend along the direction "T", and on the other hand, an up-lift of the cover 106 may be facilitated via access of one's figure into the recess 362.

Collectively applicable to FIG. 3A, FIG. 3B and FIG. 3C, the retractable protrusion 112 may take any suitable structure or shape to facilitate its operation by the user.

Similarly, the storage assembly 100 may further include one or more supplemental protrusions 113 supported on the housing 102. The supplemental protrusion 113 may be supported on the housing 102 in a similar way as the retractable protrusion 112. The supplemental protrusion 113 is mainly for positioning and stabilizing an incoming cup. Accordingly, the supplemental protrusion 113 may not necessarily acquire the features of the recess 332, the recess 362 and/or the tongue 322 referenced in FIG. 3A, FIG. 3C and/or FIG. 3B to reduce cost in manufacture and maintenance. Although only one retractable protrusion 112 and one supplemental protrusion 113 is shown for each cup holder, more retractable protrusions 112 and supplemental protrusions 113 may be utilized to facilitate the positioning of the cup in the cup holder.

In one or more embodiments, the housing 102 may be positioned at or near the vehicle console (not shown) for use by the driver and/or front seat passenger, wherein the cover 106 may be opened toward the driver or the passenger. Similarly the housing 102 may also be positioned at an armrest of a vehicle rear seat, or any other suitable location within the vehicle.

The track 104 extends along the housing 102 in the longitudinal direction "L". For purpose of illustration, the track 104 is shown as a straight line in FIG. 1A. In another one or more embodiments, the longitudinal direction "L" may follow any other suitable shapes such as a curve and a multi-segment line based upon any particular shape or package design of the cover 106.

Figure 4:
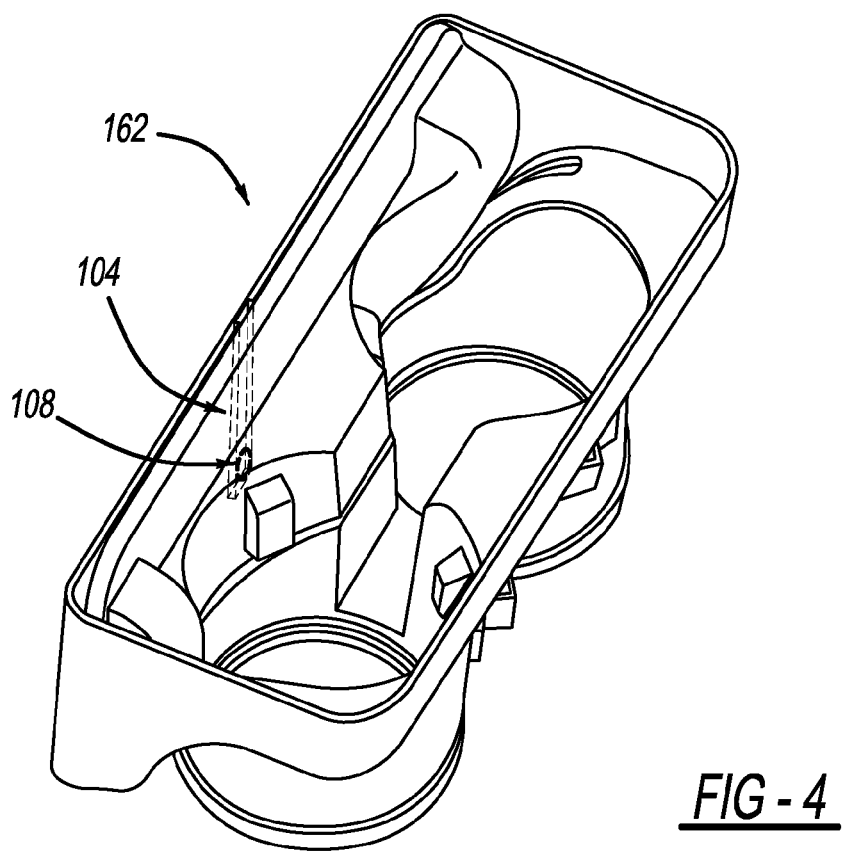
FIG. 4 illustratively depicts another perspective view of the storage assembly referenced in FIG. 1A or FIG. 1B, wherein the cover is at the first open position.

As illustratively depicted in FIG. 4, the track 104 may be at least partially defined as a longitudinal recess on the side wall 162 of the housing 102. Further, the longitudinal recess may be at least partially a through hole across a width of the side wall 162, such that the foot portion 108 may be received there through to guide the movement of the cover 106 along the direction "L". Referring further to FIG. 4, the track 104 may be at least partially positioned on the side wall 162 of the housing 102, and the cover 106 is positioned between the side wall 162 and the first cavity 120 when the cover 106 is at the first open position. Referring back to FIG. 1A, the track 104 may include first and second longitudinal recesses at least partially positioned on first and second opposing side walls 164, 166 of the housing 102, respectively.

The housing 102 includes the first cavity 120, which defines a part of the cup holder, such that the cup holder may be used for storing or retaining a cup or beverage container in the storage assembly 100. The first cavity 120 may include a cavity bottom 122 and a cavity wall 124. As is further detailed herein elsewhere, the cavity wall 124 may collectively form a side wall of the cup holder together with the recessed portion 190 of the cover 106, and the cavity bottom 122 forms the bottom of the cup holder. The cup holder or the first cavity 120 has a generally round cross-section. The cross-section of the cup holder or the first cavity 120 may be of a rectangle or any other suitable shape as needed.

Referring to FIG. 1B, in one or more embodiments, the housing 102 may further define a second cavity 180. The cover 106 may be received partially within the second cavity 180 when the cover 106 is at the first open position. Accordingly the otherwise relatively limited space within the storage assembly 100 may be utilized effectively.

Referring back to FIG. 1A-1C and FIG. 4, the foot portion 108 of the cover 106 is to be engaged with the track 104. Accordingly and with the engagement, the cover 106 may move along the housing 102 in the longitudinal direction "L" between the first open position as illustratively depicted in FIG. 1A and the second open position as illustratively depicted in FIG. 1B. The foot portion 108 may take any suitable shapes and be formed of any suitable materials. In certain embodiments, the foot portion 108 may be a protrusion extending from a side wall of the cover 106; and alternatively, the foot portion 108 may be formed as an integral part of the cover 106.

In one or more embodiments and referring to FIG. 1B and FIG. 1C, the track 104 may further include an end portion 114. Accordingly, as is further detailed herein elsewhere, the foot portion 108 may pivot about the end portion 114, such that the cover 106 may rotate relative to the housing 102 in direction "W" from the second open position as illustratively depicted in FIG. 1B to the closed position as illustratively depicted in FIG. 2. The end portion 114 may take any suitable form or position so long as the cover 104 may pivot about the end portion 114 along the direction "W."

Referring back to FIGS. 1A and 1B, the recessed portion 190 of the cover 106 may be compatible in shape with the cavity wall 124 of the first cavity 120 such that the recessed portion 190 may collectively form the cup holder together with the cavity wall 124 to accommodate an incoming beverage cup. Further, and referring back to FIG. 2, the recessed portion 190 may be positioned above the first cavity 120. The recessed portion 190 is thinner in its wall thickness relative to a surrounding wall portion 192 or 194 such that a relatively greater storage height "H" may be formed even when the cover 106 is pivoted to its closed positioned as depicted in FIG. 2. This configuration advantageously provides storage flexibility for items of certain height. Accordingly, a cup may be retained within the cup holder even after the cover 106 is pivoted to the closed position.

The storage assembly 100 may further include one or more retractable protrusions 112 supported on the cover 106. As illustratively depicted in FIG. 2, the cover 106 may include a support 210 at least partially positioned in the recessed portion 190 for supporting the protrusion 112. The support 210 may include a spring structure to provide desirable confinement of an incoming cup and support for retractability. Alternatively, the support 210 may itself be at least partially elastic and/or include an elastic component such as elastic polymer, rubber, foam, fabrics and bubbled cushion. The retractable protrusion 112 may take any other suitable form to realize the retractability.

The storage assembly 100 with a cup holder has been described herein in relation to a vehicle. However, the storage assembly 100 may be used in any suitable non-vehicle applications, such as airplanes, boats and ships, and household chairs.

As stated herein, the present invention in one or more embodiments provides the storage assembly 100 with a cup holder. However, one skilled in the art will readily recognize from such discussion, and from the accompanying drawings and claims that various changes, modifications and variations can be made therein without departing from the true spirit and fair scope of the invention as defined by the following claims.

The invention claimed is:

1. A storage assembly with a cup holder, comprising:
 a housing including a track extending in a longitudinal direction and a first cavity partially defining the cup holder;
 a cover including a foot portion and movable along the longitudinal direction between first and second open positions via engagement of the foot portion and the track; and
 one or more retractable protrusions supported on the cover and defining thereupon a recess providing access for lifting up the cover relative to the track, wherein the track further includes an end portion about which the cover pivots from the second open position to a closed position, and wherein the cover, when being at the closed position, is spaced apart from a floor of the housing along the longitudinal direction.

2. The storage assembly of claim 1, wherein the one or more retractable protrusions include a tongue portion extending toward the floor of the housing.

3. The storage assembly of claim 1, wherein the recess extends away from the floor of the housing.

4. The storage assembly of claim 1, wherein the recess extends toward a side wall of the housing, at least a portion of the side wall extending between the cover and the floor along the longitudinal direction when the cover is at the closed position.

5. The storage assembly of claim 1, wherein the housing further defines a second cavity to partially receive the cover at the first open position.

6. The storage assembly of claim 1, wherein the track is at least partially defined as a longitudinal recess on a side wall of the housing, at least a portion of the side wall extending between the cover and the floor along the longitudinal direction when the cover is at the closed position.

7. The storage assembly of claim 6, wherein the longitudinal recess is at least partially a through hole across a width of the side wall.

8. The storage assembly of claim 1, wherein the track is at least partially positioned on a side wall of the housing, at least a portion of the side wall extending between the cover and the floor along the longitudinal direction when the cover is at the closed position, and the cover being positioned between the side wall and the first cavity when the cover is at the first open position.

9. The storage assembly of claim 1, wherein the track includes first and second track members at least partially positioned onto first and second opposing side walls of the housing, respectively, at least a portion of the first and second opposing side walls extending between the cover and the floor along the longitudinal direction when the cover is at the closed position.

10. The storage assembly of claim 1, wherein the cover includes a recessed portion together with the first cavity to form the cup holder at the first open position.

11. The storage assembly of claim 10, wherein the cover further includes a support at least partially positioned in the recessed portion for supporting the one or more retractable protrusions.

12. The storage assembly of claim 1, further comprising one or more supplemental retractable protrusions positioned on a side wall of the cup holder defined within the first cavity.

13. A vehicle including a console with a cup holder, the console comprising:
 a housing including a track extending in a longitudinal direction and a first cavity partially defining the cup holder;
 a cover including a foot portion and movable along the longitudinal direction between first and second open positions via engagement of the foot portion and the track;
 one or more retractable protrusions supported on the cover and defining thereupon a recess providing access for lifting up the cover relative to the track; and
 one or more supplemental retractable protrusions positioned on a side wall of the cup holder defined within the first cavity, wherein the track further includes an end portion about which the cover pivots from the second open position to a closed position, wherein the cover, when being at the closed position, is spaced apart from a floor of the housing along the longitudinal direction.

14. The vehicle of claim 13, wherein the one or more retractable protrusions further include a tongue portion extending toward the floor of the housing.

15. The storage assembly of claim 1, wherein at least a portion of the one or more retractable protrusions is positioned along the longitudinal direction between an upper wall surface and a lower wall surface of the cover, the upper wall surface being spaced apart from the lower wall surface along a direction transverse to the longitudinal direction.

16. The vehicle of claim 13, wherein at least a portion of the one or more retractable protrusions is positioned along the longitudinal direction between an upper wall surface and a lower wall surface of the cover, the upper wall surface being spaced apart from the lower wall surface along a direction transverse to the longitudinal direction.

17. A storage assembly with a cup holder, comprising:
a housing including a track extending in a longitudinal direction and a first cavity partially defining the cup holder;
a cover including a foot portion and movable along the longitudinal direction between first and second open positions via engagement of the foot portion and the track, the track including an end portion about which the cover pivots from the second open position to a closed position, the cover at the closed position is spaced apart from a floor of the housing along the longitudinal direction;
one or more retractable protrusions supported on the cover and including a tongue portion extending toward the floor of the housing, wherein at least a portion of the one or more retractable protrusions is positioned along the longitudinal direction between an upper wall surface and a lower wall surface of the cover, the upper wall surface being spaced apart from the lower wall surface along a direction transverse to the longitudinal direction.

* * * * *